US010700629B2

(12) United States Patent
Campbell et al.

(10) Patent No.: US 10,700,629 B2
(45) Date of Patent: Jun. 30, 2020

(54) OPERATING POINT DETERMINATION IN AN ELECTRIC MOTOR SYSTEM

(71) Applicant: Faraday&Future Inc., Gardena, CA (US)

(72) Inventors: Mengwei Campbell, Torrance, CA (US); Stefan Grubic, Hermosa Beach, CA (US)

(73) Assignee: FARADAY&FUTURE INC., Gardena, CA (US)

( * ) Notice: Subject to any disclaimer, the term of this patent is extended or adjusted under 35 U.S.C. 154(b) by 0 days.

(21) Appl. No.: 15/144,252

(22) Filed: May 2, 2016

(65) Prior Publication Data

US 2017/0317635 A1 Nov. 2, 2017

(51) Int. Cl.
  *H02P 21/10* (2016.01)
  *H02P 6/08* (2016.01)
  *H02P 27/08* (2006.01)
  *H02P 21/22* (2016.01)

(52) U.S. Cl.
  CPC ............ *H02P 27/085* (2013.01); *H02P 21/22* (2016.02)

(58) Field of Classification Search
  CPC .. H02P 21/10; H02P 21/14; H02P 6/08; H02P 21/22; H02P 27/085
  USPC ........................................................ 318/757
  See application file for complete search history.

(56) References Cited

U.S. PATENT DOCUMENTS

| | | | |
|---|---|---|---|
| 6,087,792 A | 7/2000 | Wang | |
| 6,986,688 B1 | 1/2006 | Jansen | |
| 2006/0055363 A1* | 3/2006 | Patel | H02P 21/0089 318/757 |
| 2007/0296364 A1 | 12/2007 | Shoemaker et al. | |
| 2008/0100254 A1* | 5/2008 | Rahman | H02P 21/22 318/715 |
| 2009/0153087 A1 | 6/2009 | Lim et al. | |
| 2009/0284195 A1* | 11/2009 | Gallegos-Lopez | B60L 15/025 318/400.02 |
| 2012/0217916 A1 | 8/2012 | Wu et al. | |
| 2013/0181642 A1 | 7/2013 | Khan et al. | |
| 2014/0058609 A1 | 2/2014 | Matsuda | |
| 2014/0375236 A1* | 12/2014 | Kim | H02P 21/06 318/400.04 |

(Continued)

OTHER PUBLICATIONS

Office Action for U.S. Appl. No. 15/189,963, dated Feb. 8, 2018, Mengwei Campbell, "Operating Point Determination in an Electric Motor System", 21 pages.

(Continued)

*Primary Examiner* — Cortez M Cook
(74) *Attorney, Agent, or Firm* — Veros Legal Solutions, LLP (57) ABSTRACT

Systems and methods are disclosed for determining an operating point for controlling an electric motor. An exemplary system may include a voltage monitor configured to determine a voltage applied to the electric motor. The system may also include a controller configured to determine the operating point based on the voltage. The controller may include a comparator configured to determine a difference between the voltage and a reference voltage. The controller may also include a regulator configured to generate a correction signal for reducing the difference. The controller may be configured to determine the operating point when the difference is below a predetermined threshold.

23 Claims, 5 Drawing Sheets

(56) References Cited

U.S. PATENT DOCUMENTS

2015/0180387 A1 6/2015 Yoo et al.
2015/0349679 A1 12/2015 Rogers

OTHER PUBLICATIONS

Office Action for U.S. Appl. No. 15/189,963, dated Sep. 20, 2017, Mengwei Campbell, "Operating Point Determination in an Electric Motor System", 21 pages.
PCT Search Report & Written Opinion for Application No. PCT/US2017/030700, dated Sep. 20, 2017, 9 pgs.

* cited by examiner

OPERATING POINT DETERMINATION IN AN ELECTRIC MOTOR SYSTEM

TECHNICAL FIELD

This disclosure relates generally to control of electric or electrical motors, and more particularly, to systems and methods for determining operating points for implementing a maximum torque per ampere (MTPA) based control of electric or electrical motors.

BACKGROUND

Closed loop control is commonly used to regulate motor torques of high performance alternating current (AC) motors. In a typical closed loop control system of an electric motor, a target torque to be output by the electric motor can be input to the control system using a torque command. The control system then converts the torque command to a current command according to a pre-calculated look-up table. The look-up table includes data about mapping relationship between torque commands and their corresponding current commands. In some cases, multiple tables may be provided, each corresponding to a different direct current (DC) link voltage used to generate AC phase voltages through an inverter.

Each current command in the look-up table may also be referred to as an operating point. Calculation of operating points in one or multiple look-up tables is usually very time consuming. For example, it may take weeks or even months to determine all operating points in a look-up table.

SUMMARY

In one aspect, the present disclosure is directed to a system for determining an operating point for controlling an electric motor. The system may include a voltage monitor configured to determine a voltage applied to the electric motor. The system may also include a controller configured to determine the operating point based on the voltage. The controller may include a comparator configured to determine a difference between the voltage and a reference voltage. The controller may also include a regulator configured to generate a correction signal for reducing the difference. The controller may be configured to determine the operating point when the difference is below a predetermined threshold.

In another aspect, the present disclosure is directed to a method for determining an operating point for controlling an electric motor. The method may include determining, by a voltage monitor, a voltage applied to the electric motor. The method may also include determining, by a controller, the operating point based on the voltage. Determining the operating point may include determining, by a comparator, a difference between the voltage and a reference voltage. Determining the operating point may also include generating, by a regulator, a correction signal for reducing the difference. In addition, determining the operating point may include determining the operating point when the difference is below a predetermined threshold.

In a further aspect, the present disclosure is directed to a motor system. The motor system may include an electric motor including a rotor and a stator. The motor system may also include a motor control system configured to control the electric motor. The motor control system may include a voltage monitor configured to determine a voltage applied to the stator of the electric motor. The motor control system may also include a controller configured to determine an operating point based on the voltage. The controller may include a comparator configured to determine a difference between the voltage and a reference voltage. The controller may also include a regulator configured to generate a correction signal for reducing the difference. The controller may be configured to determine the operating point when the difference is below a predetermined threshold.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

The foregoing general description and the following detailed description are exemplary and explanatory only, and are not restrictive of the claims.

DETAILED DESCRIPTION

Figure 1:
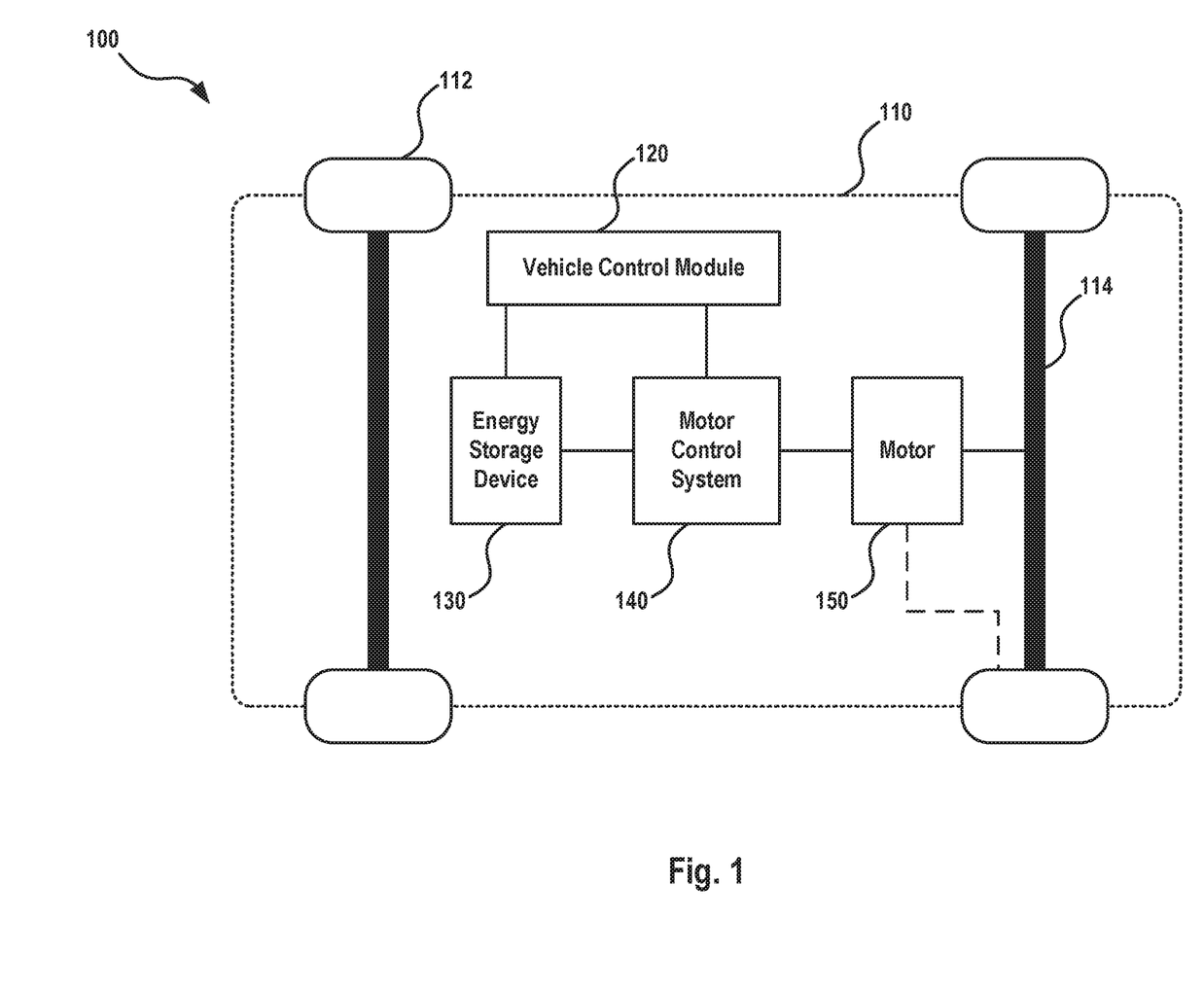
FIG. 1 is a block diagram of an exemplary embodiment of a vehicle equipped with an electric motor propulsion system.

FIG. 1 is a block diagram of an exemplary embodiment of a vehicle 100, according to one aspect of the disclosure. Vehicle 100 may have any body style, such as a sports car, a coupe, a sedan, a pick-up truck, a station wagon, a sports utility vehicle (SUV), a minivan, or a conversion van. Vehicle 100 may be an electric vehicle, a hybrid vehicle, or any other vehicle that is entirely or partially powered by electricity.

As shown in FIG. 1, vehicle 100 may include a chassis 110 and a plurality of wheels 112. Chassis 110 may be mechanically coupled to wheels 112 by, for example, a suspension system. Vehicle 100 may also include an electric or electrical motor propulsion system. For example, vehicle 100 may include one or more electric motors, such as motor 150, to supply motive torque. Wheels 112 may be coupled to motor 150 in various ways. In one embodiment, as illustrated in FIG. 1, opposite wheels may be connected through a shaft 114, which may be mechanically coupled to motor 150 to transmit torque and rotation from motor 150 to the connecting wheels. In another embodiment, motor 150 may drive individual wheels directly, as illustrated, in a simplified manner, by a dashed line from motor 150 to the lower right wheel. For example, motor 150 may be located close to a wheel to provide driving power directly to the wheel. In this case, multiple motors may be used and each wheel may be driven by a separate motor or a group of motors. In another example, motor 150 may be built into a wheel such that the wheel may rotate co-axially with a rotor of the motor.

Motor 150 may be an AC synchronous electric motor including a rotor and a stator (not shown). The stator may include a plurality of poles, with each pole including windings connected to an AC power source, such as a three-phase AC power source. During operation, the AC powered stator may generate a rotating magnetic field to drive the rotor to rotate. The rotor may include windings and/or permanent magnet(s) to form a magnet such that the north/south pole of the magnet is continuously attracted by the south/north pole of the rotating magnetic field generated by the stator, thereby rotating synchronously with the rotating magnetic field. Exemplary AC synchronous electric motors include interior permanent magnet (IPM) motors, reluctance motors, and hysteresis motors.

Motor 150 may be controlled by a motor control system 140. Motor control system 140 may regulate energy transfer from an energy storage device 130 to motor 150 to drive motor 150. In some embodiments, motor 150 may operate in a generator mode, such as when vehicle 100 undergoes speed reduction or braking actions. In the generator mode, the excess motion energy may be used to drive motor 150 to generate electrical energy and feed the energy back to energy storage device 130 through motor control system 140. In some embodiments, energy storage device 130 may include one or more batteries to supply DC power. Motor control system 140 may include a DC-AC inverter to convert the DC power supplied by energy storage device 130 into AC driving power to drive motor 150. For example, the DC-AC inverter may include power electronic devices operating under a pulse-width modulation (PWM) scheme to convert the DC power into AC power.

Vehicle 100 may include a vehicle control module 120 to provide overall control of vehicle 100. In some embodiments, vehicle control module 120 may act as an interface between user operation and propulsion system reaction. For example, when a driver depresses an acceleration pedal of vehicle 100, vehicle control module 120 may translate the acceleration operation into a torque value to be output by motor 150, a target rotation speed of motor 150, or other similar parameters to be executed by the propulsion system. Vehicle control module 120 may be communicatively connected to motor control system 140 to supply commands and/or receive feedback. Vehicle control module 120 may also be communicatively connected to energy storage device to monitor operation status such as energy level, temperature, recharge count, etc.

In some embodiments, motor 150 may be a synchronous motor, such as an IPM motor, driven by three-phase power. The three-phase signals can be represented in a reference frame, using a direct-quadrature (d-q) coordinate system. For example, in the reference frame (e.g., the d-q reference frame), the field flux linkage component (along the d axis) and the torque component (along the q axis) of a three-phase AC signal are decoupled to orthogonal directions d and q. In addition, when motor 150 is a synchronous motor, the d-q reference frame is a synchronous frame.

The stator voltages of the IPM in the synchronous frame can be represented as follows:

$$V_{ds} = R_s i_{ds} + L_{ds}\frac{di_{ds}}{dt} - \omega_e L_{qs} i_{qs} \quad (1)$$

$$V_{qs} = R_s i_{qs} + L_{qs}\frac{di_{qs}}{dt} + \omega_e L_{ds} i_{ds} + \omega_e \lambda_f \quad (2)$$

where $R_s$ is stator resistance, $\omega_e$ is electrical speed, $V_{ds}$ and $V_{qs}$ are stator voltages, $i_{ds}$ and $i_{qs}$ are stator line currents, $L_{ds}$ and $L_{qs}$ are d- and q-axis inductances in the synchronous reference frame, and $\lambda_f$ is permanent magnet flux linkage. The torque equation is as follows:

$$T=3/2 n_p(\lambda_f i_{qs}+(L_{ds}-L_{qs})i_{qs}i_{ds}) \quad (3)$$

where $n_p$ is the number of pole pairs.

In some embodiments, motor 150 may be driven by an inverter, which converts a DC voltage, for example provided by energy storage device 130, into three-phase AC voltages for driving motor 150. In this case, the torque and speed of motor 150 may be limited by the voltage and current ratings of the inverter and/or motor 150. For example, the maximum stator voltage $V_{s\_max}$ may be limited by the DC voltage. Therefore, the constraint applied to the d- and q-axis voltages can be represented as follows:

$$V_{ds}^2+V_{qs}^2 \le V_{s\_max}^2 \quad (4)$$

Similarly, the stator current may be limited by the maximum current $I_{s\_max}$ that can be supported by motor 150 and/or the power electronic devices of the inverter:

$$i_{ds}^2+i_{qs}^2 \le I_{s\_max}^2 \quad (5)$$

In steady state, the derivative terms in equations (1) and (2) are zero and thus, those derivative terms can be omitted. In addition, when the speed is high, the voltage drop across the stator resistor can be neglected. Therefore, equations (1) and (2) can be simplified by omitting both the derivative terms and the stator resistor voltage terms. Substituting the d- and q-axis voltages in equation (4) with the simplified equations (1) and (2) yields the following voltage constraint as a function of the stator currents:

$$L_{ds}^2\left(i_{ds} + \frac{\lambda_f}{L_{ds}}\right)^2 + L_{qs}^2 i_{qs}^2 \le \left(\frac{V_{s\_max}}{\omega_e}\right)^2 \quad (6)$$

Figure 2:
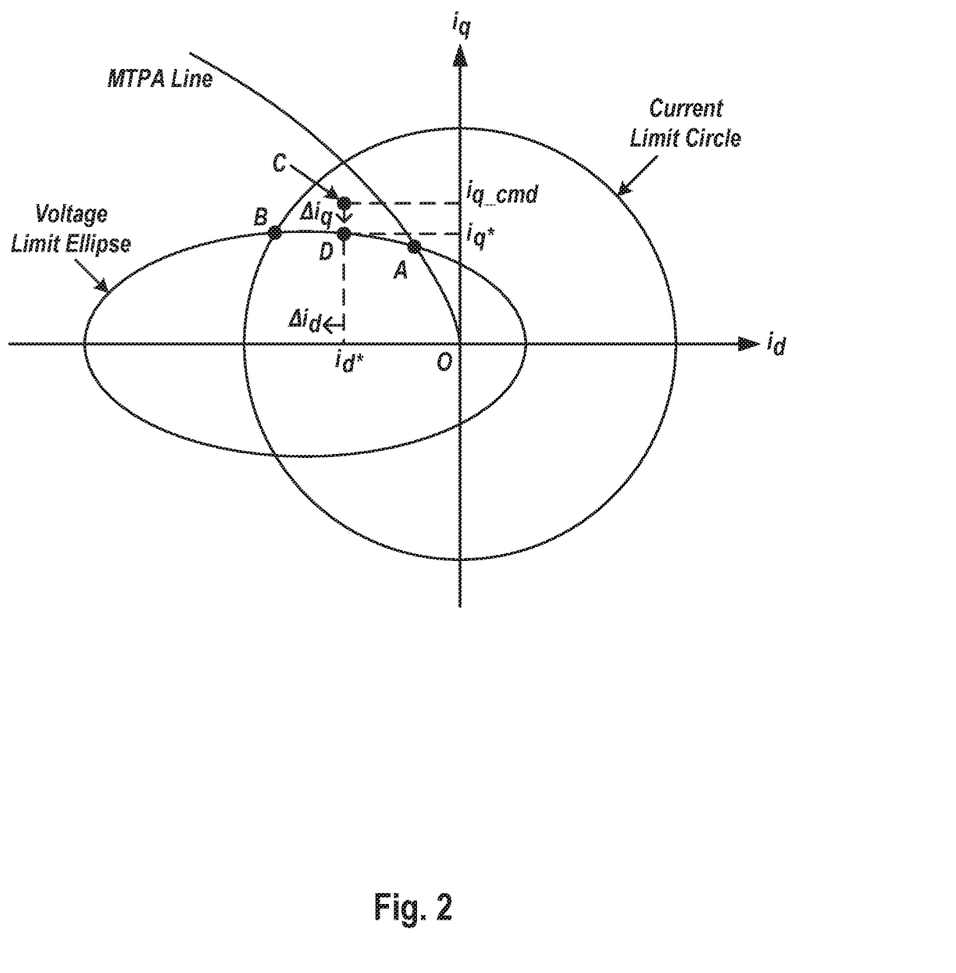
FIG. 2 shows exemplary operating points in a reference frame.

The current constraint shown in equation (5) can be graphically represented in the d-q reference coordinates as a circle. Similarly, the voltage constraint, in terms of stator currents, as shown in equation (6) can be graphically represented as an ellipse. FIG. 2 illustrates an exemplary current limit circle and an exemplary voltage limit ellipse defined by equations (5) and (6), respectively. In FIG. 2, the horizontal axis is the d-axis, represented by $i_d$, while the vertical axis is the q-axis, represented by $i_q$. A stator current can be represented by a point in the d-q reference frame shown in FIG. 2, such as a point ($i_{ds1}$, $i_{qs1}$) (not shown). Such a point can be referred to as an operating point. Alternatively, operating point ($i_{ds1}$, $i_{qs1}$) can also be represented by a magnitude and an angle of a current vector, which points from the origin (point O) to the end point ($i_{ds1}$, $i_{qs1}$).

A feasible operating point should satisfy both equations (5) and (6). Therefore, all feasible operating points should be within the overlapping area of the voltage limit ellipse and the current limit circle.

FIG. 2 also shows an MTPA line, which may be determined by any suitable method. During the operation of motor 150, it is desirable that the operating point follows the MTPA line. However, due to the voltage constraints the MTPA line cannot be followed beyond the voltage limit. To further increase the torque, the operating point has to follow the envelope of the voltage limit ellipse. In FIG. 2, this section of the voltage limit ellipse envelope is between point A (the intersection of the voltage limit ellipse and the MTPA line) and point B (the intersection of the voltage limit ellipse and the current limit circle). Because motor 150 operates in a field weakening mode when the operating point is on the voltage limit ellipse envelope between A and B, such an operating point can also be referred to as an MTPA point in the field weakening region. In contrast, the points on the MTPA line between the origin and point A can be referred to as MTPA points in a non-field weakening region.

Accurate determination of the operating points between A and B can be a time consuming and tedious task. For example, the operating points can be determined through simulation using motor machine models. However, using motor machine models usually does not provide a sufficiently accurate solution due to uncertainties in the models, especially uncertainties regarding the losses (e.g., DC & AC resistive losses, core losses, windage and friction losses, etc.). Alternatively, an experimental approach can be conducted, in which the whole operating map is scanned to identify operating points where the steady state current error moves from a negative value to zero or vice versa. However, this experimental procedure is very time consuming. The accuracy of the experimentally obtained operating points depends on the current and angle increment(s) used for scanning. To achieve a higher accuracy a smaller increment is required, leading to a longer time to complete the scan.

The embodiments disclosed in this application aim to accelerate the operating point determination process. For example, operating points (e.g., between A and B in FIG. 2) may be obtained by regulating the current command so that the maximum voltage is applied to motor 150. In some embodiments, the maximum voltage may be the maximum AC voltage that can theoretically and/or practically be produced by an AC power supply of motor 150. For example, the maximum voltage can be represented using the peak value of the AC voltage. When an inverter is used as an AC power supply by converting DC voltage (e.g., provided by energy storage device 130) into AC voltage that drives motor 150, the amplitude (e.g., the peak value) of the AC voltage depends on the DC voltage. Therefore, the maximum voltage also depends on the DC voltage.

The current command can be regulated in several ways to apply the maximum voltage to motor 150. In some embodiments, the current command may be regulated by an operating point controller. The operating point controller may include a proportional-integral (PI) regulator. The PI regulator can regulate the current command such that a resulting stator voltage converges to the maximum voltage. In other words, the PI regulator can reduce and/or minimize the difference between the resulting stator voltage and the maximum voltage through a closed loop feedback process. FIG. 2 shows an exemplary current command regulating process. As shown in FIG. 2, to determine an operating point D on the envelope of the voltage limit ellipse, the d-axis current component (e.g., $i_d^*$) may be fixed and the q-axis current component may be adjusted by the PI regulator until motor 150 operates at target operating point D (point ($i_d^*$, $i_q^*$)) where the maximum voltage is applied to motor 150. For example, a q-axis current command $i_{q\_cmd}$ may be used as an initial value, and the operating point defined by $i_d^*$ and $i_{q\_cmd}$ may be represented by point C. The regulating process may adjust $i_{q\_cmd}$ by a correction value $\Delta i_q$ one or more times until $i_{q\_cmd}$ reaches or approaches closely enough to $i_q^*$. In other words, the regulating process moves the initial point C to target point D, where the maximum voltage is applied to motor 150. Once point D is determined, $i_d^*$ may be changed to the next value by an increment $\Delta i_d$ to determine the next operating point.

The method described above can significantly increase the speed and accuracy of operating point determination. In addition, using this method, not only the operating points between A and B but all operating points along the voltage limit ellipse can be determined. In some embodiments, points between A and B (i.e., MTPA points in the field weakening region) may be added to the look-up table(s) used for the control of motor 150. In some embodiments, the method described above or a variation thereof may be used to control motor 150 in real time operation.

Figure 3:
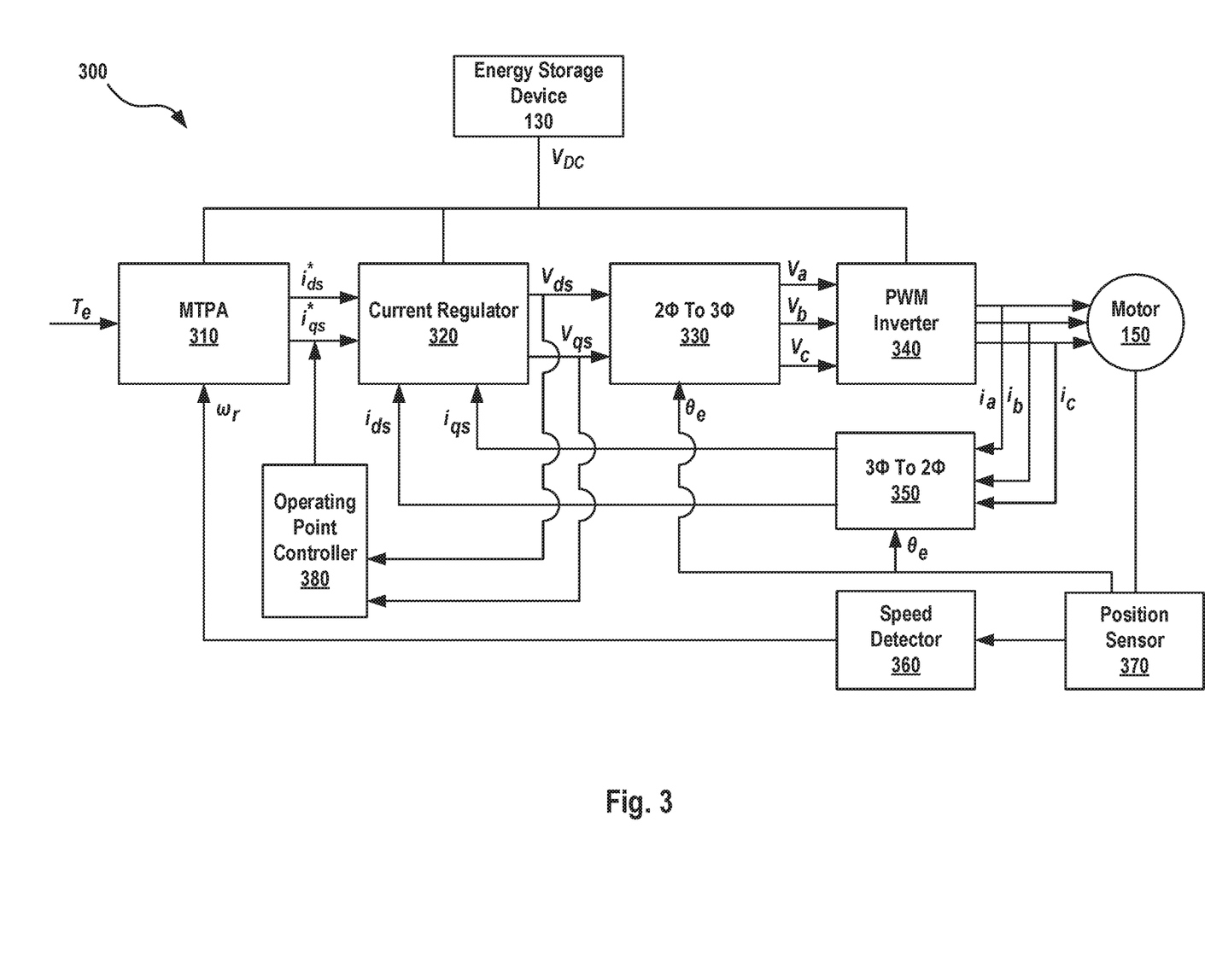
FIG. 3 is a block diagram of an exemplary motor control system including an exemplary operating point controller.

FIG. 3 is a block diagram of an exemplary embodiment of a motor control system 300 including an operating point controller 380 for determining operating points. Motor control system 300 may include an MTPA module 310. MTPA module 310 may receive a torque command $T_e$ from, for example, vehicle control module 120, and generate corresponding d axis and q axis components of a current command ($i_{ds}^*$ and $i_{qs}^*$). For example, MTPA module 310 may include one or more look-up tables storing mapping relations between values of $T_e$ and values of $i_{ds}^*$ and $i_{qs}^*$ for a given rotational speed $\omega_r$ and a given DC voltage $V_{DC}$. The current command may be input to a current regulator 320. Current regulator may determine the difference between $i_{ds}^*$ and feedback current $i_{ds}$ and the difference between $i_{qs}^*$ and feedback current $i_{qs}$ to control a voltage command ($V_{ds}$ and $V_{qs}$). The voltage command in the d-q reference frame may be converted into actual phase voltages ($V_a$, $V_b$, and $V_c$) by a two-phase to three-phase transformer 330. The actual phase voltages may be input to a PWM inverter 340 to drive motor 150. Phase currents ($i_a$, $i_b$, and $i_c$) may be measured and processed by a three-phase to two-phase transformer 350 to provide feedback currents ($i_{ds}$ and $i_{qs}$) in d-q reference frame to current regulator 320. A position sensor 370 may be used to measure the rotor position and provide the measured position information $\theta_e$ to transformers 330 and 350. The position information may also be used by a speed detector 360 to determine the rotational speed $\omega_r$.

As shown in FIG. 3, motor control system 300 may include operating point controller 380 configured to determine operating points. For example, controller 380 may receive information indicative of a voltage applied to motor 150 (also referred to as voltage information) and determine the operating point based on the voltage. The voltage information may be measured or sampled by a voltage monitor, which may be part of controller 380 or a separate device. In some embodiments, the voltage information may be obtained by measuring the phase voltages $V_a$, $V_b$, and $V_c$ (not shown in FIG. 3). In some embodiments, as shown in FIG. 3, the voltage information may be obtained by measuring the d- and q-axis voltages $V_{ds}$ and $V_{qs}$.

In some embodiments, controller 380 may be implemented by one or more processor devices executing an algorithm and/or instructions stored in a memory device. In some embodiments, controller 380 may be implemented by one or more circuits configured to perform functions such as signal sampling, signal comparison, signal amplification or attenuation, logical operation, proportional-integral-derivative (PID) regulation, signal limitation, etc. In some embodiments, error detector 380 may be implemented by a combination of processor device(s) and circuit(s).

Figure 4:
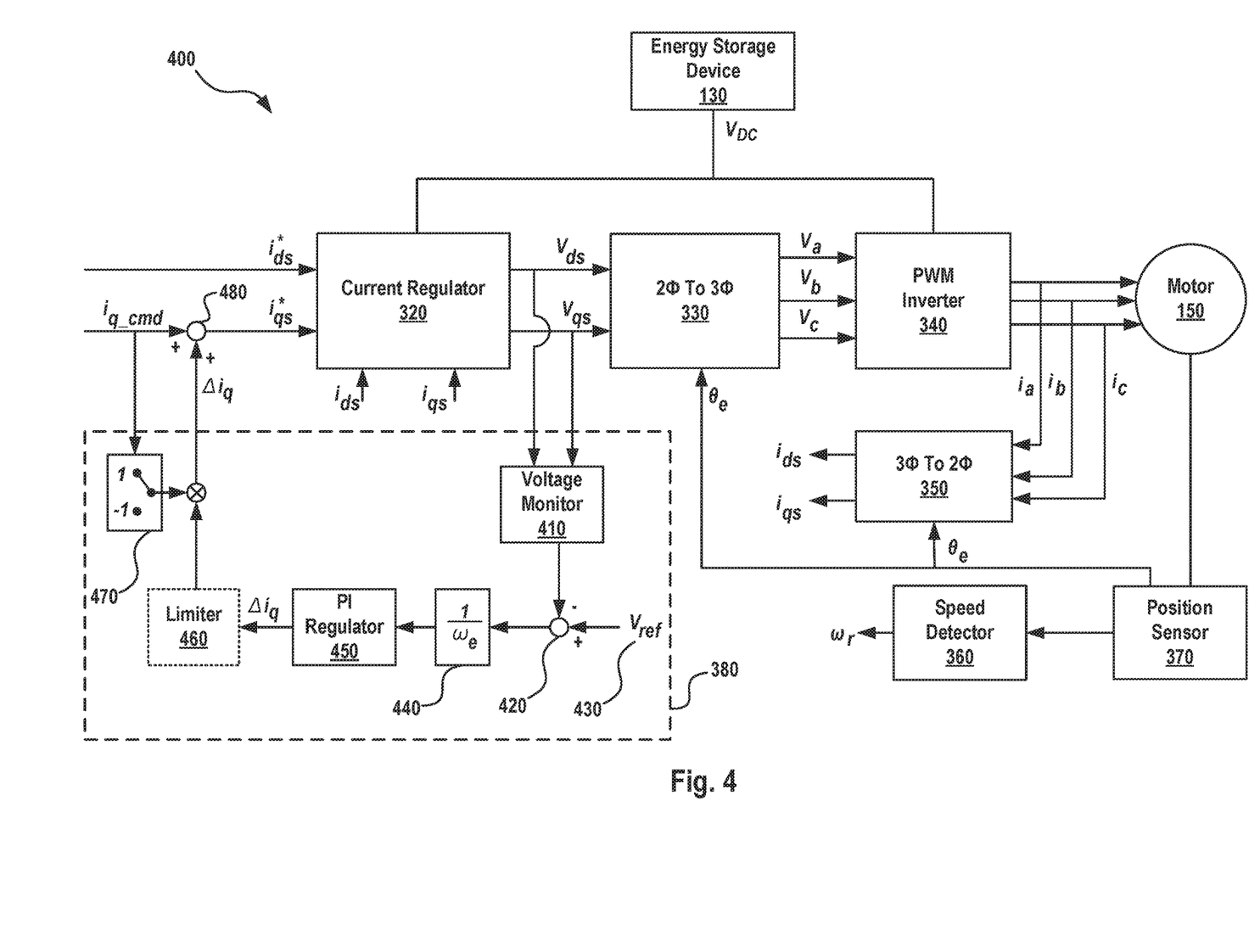
FIG. 4 shows an exemplary implementation of the operating point controller shown in FIG. 3.

FIG. 4 is a block diagram of an exemplary embodiment of a motor control system 400 including an exemplary implementation of the operating point controller 380. As shown in FIG. 4, a voltage monitor 410 may sample the d- and q-axis voltages $V_{ds}$ and $V_{qs}$ from a voltage command output by current regulator 320. Voltage monitor 410 may be integrated with controller 380, as shown in FIG. 4, or may be implemented as a separate device. Voltage monitor 410 may determine the voltage applied to motor 150 by calculating the phase voltage $V_s = \sqrt{V_{ds}^2 + V_{qs}^2}$. If the phase voltage $V_s$ is not the same as the maximum voltage, controller 380 may regulate the current command to change the phase voltage toward the maximum voltage. For example, controller 380 may include a comparator 420 configured to compare the phase voltage determined by voltage monitor 410 with a reference voltage $V_{ref}$ (430) and generate a difference between the phase voltage and the reference voltage. The difference may also be referred to as a voltage error. The reference voltage may be set to be the maximum voltage. The difference may be normalized by a normalizer 440. For example, Normalizer 440 may normalize the difference by the electrical speed $\omega_e$. The normalized difference may be input to a PI regulator 450.

As discussed above in connection with FIG. 2, the d-axis current command may be kept unchanged, and the q-axis current command may be adjusted by PI regulator 450 to generate a correction signal $\Delta i_q$ for reducing the difference. The correction signal $\Delta i_q$ may then be input to current regulator 320 to reduce the difference. The voltage command resulting from the application of $\Delta i_q$ may be sampled and compared again with the reference voltage to further reduce the difference if necessary. This closed loop feedback process may be repeated until the difference is reduced to zero or below a predetermined tolerance threshold (e.g., when the phase voltage converges to the reference voltage). Once the phase voltage converges to the reference voltage, the corresponding current command ($i_d$, $i_q$) may be determined by controller 380 as the operating point (e.g., operating point D shown in FIG. 2).

In some embodiments, the initial value for the q-axis current command is not limited to any particular region and can be set arbitrarily. However, the determination process may be faster if the initial value of the q-axis current command is closer to the envelop of the voltage limit ellipse.

In some embodiments, PI regulator 450 may be configured to limit the correction signal $\Delta i_q$ within a predetermined range. For example, the magnitude of $\Delta i_q$ can be limited to a relatively small value to limit the rate of change in the q-axis current command, which may result in a relatively smooth convergence at the price of reduced convergence speed. Once an operating point is found based on a particular d-axis current command, determination of a new operating point may be initiated by adjusting the d-axis current command by an increment $\Delta i_d$, as shown in FIG. 2. The number of operating points between A and B that are required for the look-up table may be predetermined or may be dynamically determined depending on particular applications.

Referring back to FIG. 2, in the field weakening region (e.g., when motor 150 operates in a field weakening mode), the q-axis current command is positive. On the other hand, in the regeneration region (e.g., when motor 150 operates in a regeneration mode), the q-axis current command is negative. Therefore, to determine operating points in the regeneration region (e.g., in the third quadrant of the reference frame shown in FIG. 2), controller 380 may include a sign modifier 470 to change the sign of $\Delta i_q$ based on the sign of input q-axis current command $i_{q\_cmd}$.

In some embodiments, controller 380 may be configured to determine operating points during real-time operation of motor 150. During real time motor operation, the current command may not be altered when motor 150 is operating inside the voltage constraints, which limits the correction signal $\Delta i_q$ to negative values. To ensure that $\Delta i_q$ is negative during real time operation, controller 380 may include a limiter 460. Limiter 460 may nullify the correction signal $\Delta i_q$ when $\Delta i_q$ is positive, which indicates that motor 150 operates in a non-field weakening mode, such as within the voltage limit ellipse shown in FIG. 2. With limiter 460, controller 380 may be effective only when the q-axis current command moves outside the voltage limit ellipse. When the operating point defined by a real time current command ($i_d$, $i_q$) leaves the voltage limit ellipse, controller 380 may function to steer the operating point back to the voltage limit ellipse, e.g., a feasible operating point between A and B. Limiter 460 may be present during real time operation and may be omitted during non-real time scenarios, such as during a calibration process in a: design phase, pre-shipment testing phase, or post-shipment phase. For this reason, limiter 460 is shown as a dashed box in FIG. 4.

The embodiment shown in FIG. 4 determines operation points by fixing the d-axis current command and adjusting the q-axis current command. In some embodiments, other current command regulation methods may also be used. For example, d-axis current command may be adjusted while keeping the q-axis current command constant. In another example, both d-axis and q-axis current commands may be adjusted.

Figure 5:
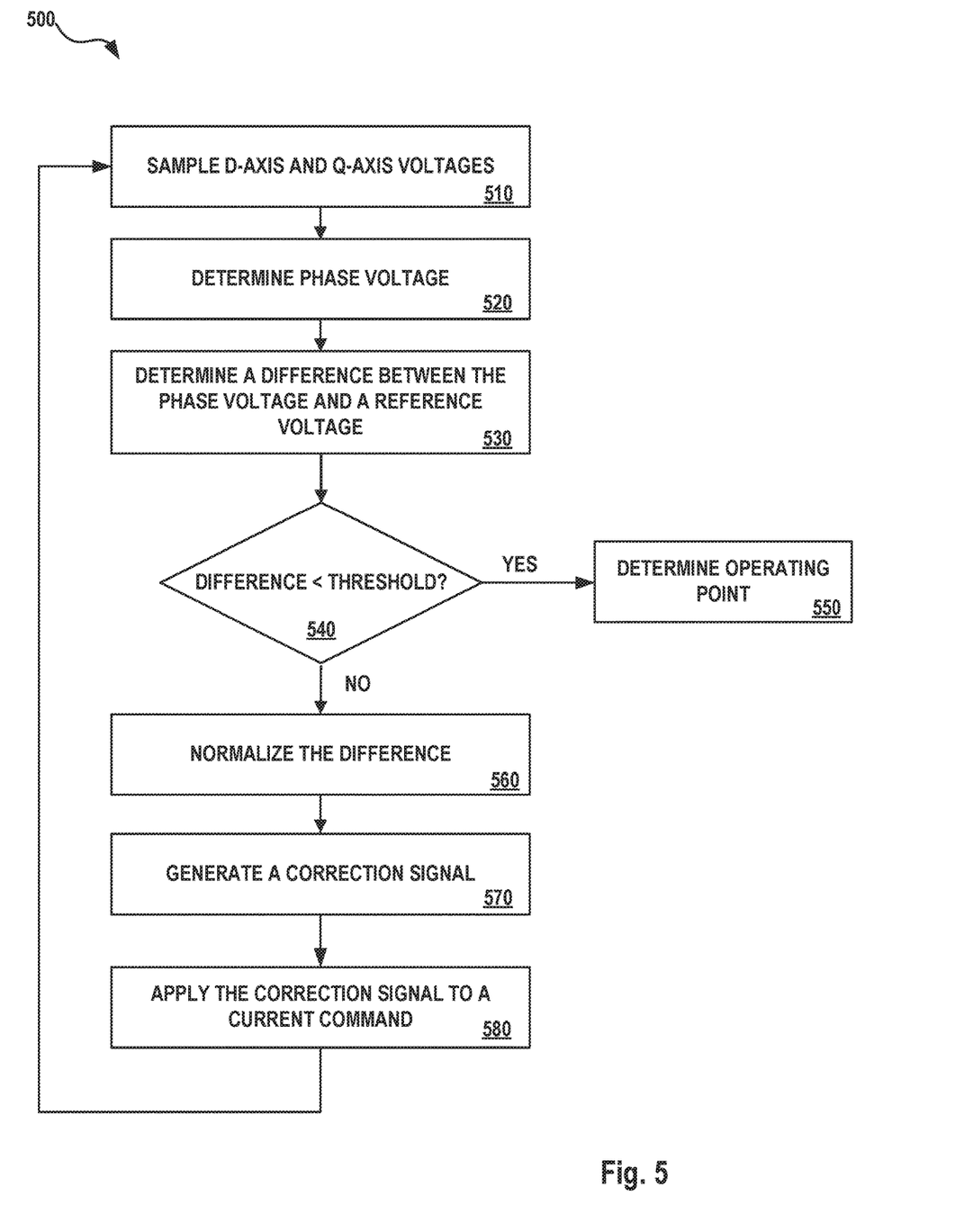
FIG. 5 is a flow chart illustrating an exemplary method of determining an operating point for controlling an electric motor.

FIG. 5 is a flowchart depicting a method 500 for determining an operating point, according to an embodiment of this disclosure. Method 500 includes a plurality of steps, some of which may be optional. Method 500 may be carried out by a processor device executing an algorithm and/or instructions, by dedicated circuitries configured to perform one or more specific functions, or by a combination thereof.

In step 510, voltage monitor 410 may sample the d-axis and q-axis voltages. For example, voltage monitor 410 may sample voltages $V_{ds}$ and $V_{qs}$ from a voltage command output by current regulator 320, as shown in FIG. 4.

In step 520, voltage monitor 410 may determine the phase voltage. For example, Voltage monitor 410 may calculate the phase voltage $V_s = \sqrt{V_{ds}^2 + V_{qs}^2}$.

In step 530, comparator 420 may compare the phase voltage and a reference voltage and determine a difference between the phase voltage and the reference voltage. For example, comparator 420 may compare the phase voltage and the reference voltage $V_{ref}$, which may be set as the maximum voltage that can be produced by inverter 340. As described above, the maximum voltage may depend on the DC voltage provided by power supply 340.

In step 540, controller 380 may determine whether the difference is below a predetermined threshold or whether the phase voltage converges to the reference voltage. If the difference is below the threshold, as indicated by the YES branch, method 500 proceeds to step 550, in which controller 380 may determine the operating point to be the corresponding current command ($i_d$, $i_q$) that is used to generate the phase voltage.

If the difference is not below the threshold, method proceeds to step 560, in which normalizer 440 may normalize the difference. For example, normalizer 440 may normalize the difference by the electrical speed $\omega_e$.

In step 570, PI regulator 450 may generate a correction signal $\Delta i_q$ for reducing the difference. The correction signal $\Delta i_q$ may move the operating point toward the voltage limit ellipse shown in FIG. 2. In some embodiments, the correction signal $\Delta i_q$ may be limited to a predetermined range to limit the rate of change in the current command.

In step 580, controller 380 may apply the correction signal $\Delta i_q$ to a current command (e.g., $i_{q\_cmd}$) that is input to current regulator 320 to reduce the difference. For example, $\Delta i_q$ may be added to $i_{q\_cmd}$ and the resulting value may be used as the new input q-axis current command. The new current command may result in a new voltage response at the output of current regulator 320, which may be sampled and further compared with the reference voltage (e.g., looping back to step 510) until the difference is reduced below the threshold, or when the phase voltage converges to the reference voltage.

The embodiments disclosed above include systems and methods for determining operating points of an electric motor. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed embodiments are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be used in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples of computer-readable media include RAM, ROM, volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

The invention claimed is:

1. A system for determining an operating point for controlling an electric motor, the system comprising:
a voltage monitor configured to determine a voltage applied to the electric motor; and
a controller configured to determine the operating point based on the voltage, the controller including:
a comparator configured to determine a difference between the voltage and a reference voltage;
a regulator configured to generate a correction signal for reducing the difference by holding a field flux linkage component of a current command constant and adjusting a torque component of the current command constant and limit the rate of change in the torque component; and
a limiter configured to nullify the correction signal when the correction signal indicates that the electric motor operates in a non-field weakening mode;
wherein the controller is configured to determine the operating point when the difference is below a predetermined threshold; and
wherein the limiter is omitted during a calibration process.

2. The system of claim 1, wherein the operating point includes a maximum torque per ampere (MTPA) point in a field weakening region.

3. The system of claim 1, wherein the operating point includes a current command, the current command including:
a magnitude and an angle of a current vector; or
direct and quadrature components of the current vector in a reference frame.

4. The system of claim 1, wherein:
the electric motor is driven by an inverter configured to convert a direct current (DC) voltage to an alternating current (AC) voltage applied to a stator of the electric motor; and
the reference voltage is a maximum AC voltage that can be produced by the inverter by converting the DC voltage.

5. The system of claim 1, wherein the voltage monitor is configured to:
sample direct and quadrature components of a voltage command output by a current regulator; and
determine the voltage applied to the electric motor based on the direct and quadrature components of the voltage command.

6. The system of claim 1, wherein:
the controller includes a normalizer configured to normalize the difference determined by the comparator based on an electrical speed; and
the regulator is configured to generate the correction signal based on the normalized difference.

7. The system of claim 1, wherein the regulator is configured to limit the correction signal within a predetermined range.

8. The system of claim 1, wherein the controller is configured to determine the operating point during real time operation of the electric motor.

9. The system of claim 1, wherein the controller is configured to determine the operating point during calibration of the electric motor.

10. The system of claim 1, wherein the controller is configured to:
determine whether the electric motor operates in a regeneration mode; and
modify the correction signal when it is determined that the electric motor operates in the regeneration mode.

11. A method for determining an operating point for controlling an electric motor, the method comprising:
determining, by a voltage monitor, a voltage applied to the electric motor; and
determining, by a controller, the operating point based on the voltage, including:

determining, by a comparator, a difference between the voltage and a reference voltage;

generating, by a regulator, a correction signal for reducing the difference by holding a field flux linkage component of a current command constant and adjusting a torque component of the current command constant and limit the rate of change in the toque component;

nullifying, by a limiter, the correction signal when the correction signal indicates that the electric motor operates in a non-field weakening mode; and determining the operating point when the difference is below a predetermined threshold; and omitting the limiter during a calibration process.

12. The method of claim 11, wherein the operating point includes a maximum torque per ampere (MTPA) point in a field weakening region.

13. The method of claim 11, wherein the operating point includes a current command, the current command including:

a magnitude and an angle of a current vector; or direct and quadrature components of the current vector in a reference frame.

14. The method of claim 11, comprising:

converting, by an inverter, a direct current (DC) voltage to an alternating current (AC) voltage to drive the electric motor, wherein the reference voltage is a maximum AC voltage that can be produced by the inverter by converting the DC voltage.

15. The method of claim 11, comprising:

sampling, by the voltage monitor, direct and quadrature components of a voltage command output by a current regulator; and determining, by the voltage monitor, the voltage applied to the electric motor based on the direct and quadrature components of the voltage command.

16. The method of claim 11, comprising:

normalizing the difference between the voltage and the reference voltage based on an electrical speed; and generating the correction signal based on the normalized difference.

17. The method of claim 11, comprising: limiting, by the regulator, the correction signal within a predetermined range.

18. The method of claim 11, comprising: determining the operating point during real time operation of the electric motor.

19. The method of claim 11, comprising: determining the operating point during simulated operation of the electric motor.

20. The method of claim 11, comprising:

determining whether the electric motor operates in a regeneration mode; and modifying the correction signal when it is determined that the electric motor operates in the regeneration mode.

21. A motor system, comprising:

an electric motor including a rotor and a stator; and a motor control system configured to control the electric motor, the motor control system including:

a voltage monitor configured to determine a voltage applied to the stator of the electric motor; and a controller configured to determine an operating point based on the voltage, the controller including:

a comparator configured to determine a difference between the voltage and a reference voltage;

a regulator configured to generate a correction signal for reducing the difference by holding a field flux linkage component of a current command constant and adjusting a torque component of the current command constant and limit the rate of change in the toque component; and a limiter configured to nullify the correction signal when the correction signal indicates that the electric motor operates in a non-field weakening mode;

wherein the controller is configured to determine the operating point when the difference is below a predetermined threshold; and wherein the limiter is omitted during a calibration process.

22. The motor system of claim 21, wherein the electric motor includes a synchronous electric motor.

23. The motor system of claim 22, wherein the electric motor includes an interior permanent magnet (IPM) motor.

* * * * *